(12) United States Patent
Komata (10) Patent No.: US 12,223,664 B2
(45) Date of Patent: Feb. 11, 2025

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Toshiya Komata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 17/743,530

(22) Filed: May 13, 2022

(65) Prior Publication Data

US 2022/0383520 A1  Dec. 1, 2022

(30) Foreign Application Priority Data

Jun. 1, 2021  (JP) .................................. 2021-092514

(51) Int. Cl.
*G06T 7/254* (2017.01)
*G06T 7/246* (2017.01)

(52) U.S. Cl.
CPC .............. *G06T 7/254* (2017.01); *G06T 7/248* (2017.01); *G06T 2207/10016* (2013.01); *G06T 2207/20224* (2013.01)

(58) Field of Classification Search
CPC ..... G06T 7/248; G06V 10/774; G06F 18/214; H04N 25/134
See application file for complete search history.

(56) References Cited

U.S. PATENT DOCUMENTS

| | | | |
|---|---|---|---|
| 7,028,139 B1* | 4/2006 | Kiselev | G06F 11/1088 714/6.24 |
| 7,660,438 B2* | 2/2010 | Camus | G01S 3/7864 382/104 |
| 7,680,425 B2* | 3/2010 | Hama | G03G 15/0131 399/49 |
| 7,881,494 B2* | 2/2011 | Kitamura | G06V 40/165 382/103 |
| 8,379,074 B2* | 2/2013 | Currivan | H04N 7/141 348/14.02 |
| 8,401,228 B2* | 3/2013 | Muramatsu | G06T 7/248 348/208.14 |

FOREIGN PATENT DOCUMENTS

JP  2012-073397 A  4/2012

* cited by examiner

*Primary Examiner* — Yosef Kassa
(74) *Attorney, Agent, or Firm* — Carter, DeLuca & Farrell LLP

(57) ABSTRACT

An image processing apparatus comprises an acquisition unit configured to acquire reference information which indicates at least one of a number of objects detected from a frame, a density of an object in a frame, or a frame rate, and a tracking unit configured to track an identical object between frames. The tracking unit determines that each of objects for which a difference in a detection position between the frames is smaller than a threshold value corresponding to the reference information is an identical object, and does not determine that each of objects for which a difference in the detection position between the frames is equal to or larger than the threshold value is an identical object.

12 Claims, 7 Drawing Sheets

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technology for tracking an identical object between frames.

Description of the Related Art

In the related art, a technology is known in which an arbitrary object is detected from a plurality of consecutive images including video to track an identical object among the consecutive images. Japanese Patent Laid-Open No. 2012-73397 discloses a technology for tracking a human body by determining a motion vector that means a difference between two consecutive frames, predicting a movement destination of the identical human body based on the motion vector, and limiting a detection range.

The method of tracking the human body by predicting a detection position in the next frame poses a problem in that tracking accuracy decreases in a case where the human body moves more broadly than expected. In the technology disclosed in Japanese Patent Laid-Open No. 2012-73397, the tracking is based on the motion vector of the entire image. However, the technology may fail in the tracking in a case where a part of the human body moves broadly.

SUMMARY OF THE INVENTION

An aspect of the present invention provides a technology with which in a case where an object appearing in frames is tracked, the tracking is accurately performed even in a case where the object moves broadly.

According to the first aspect of the present invention, there is provided an image processing apparatus comprising: an acquisition unit configured to acquire reference information which indicates at least one of a number of objects detected from a frame, a density of an object in a frame, or a frame rate; and a tracking unit configured to track an identical object between frames, wherein the tracking unit determines that each of objects for which a difference in a detection position between the frames is smaller than a threshold value corresponding to the reference information is an identical object, and does not determine that each of objects for which a difference in the detection position between the frames is equal to or larger than the threshold value is an identical object.

According to the second aspect of the present invention, there is provided an image processing method performed by an image processing apparatus, the image processing method comprising: acquiring reference information which indicates at least one of a number of objects detected from a frame, a density of an object in a frame, or a frame rate; and tracking an identical object between frames, wherein in the tracking, each of objects for which a difference in a detection position between the frames is smaller than a threshold value corresponding to the reference information is determined to be an identical object, and each of objects for which a difference in the detection position between the frames is equal to or larger than the threshold value is not determined to be an identical object.

According to the third aspect of the present invention, there is provided a non-transitory computer-readable storage medium in which a computer program is stored, the computer program causing a computer to function as: an acquisition unit configured to acquire reference information which indicates at least one of a number of objects detected from a frame, a density of an object in a frame, or a frame rate; and a tracking unit configured to track an identical object between frames, wherein the tracking unit determines that each of objects for which a difference in a detection position between the frames is smaller than a threshold value corresponding to the reference information is an identical object, and does not determine that each of objects for which a difference in the detection position between the frames is equal to or larger than the threshold value is an identical object.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

Figure 1:
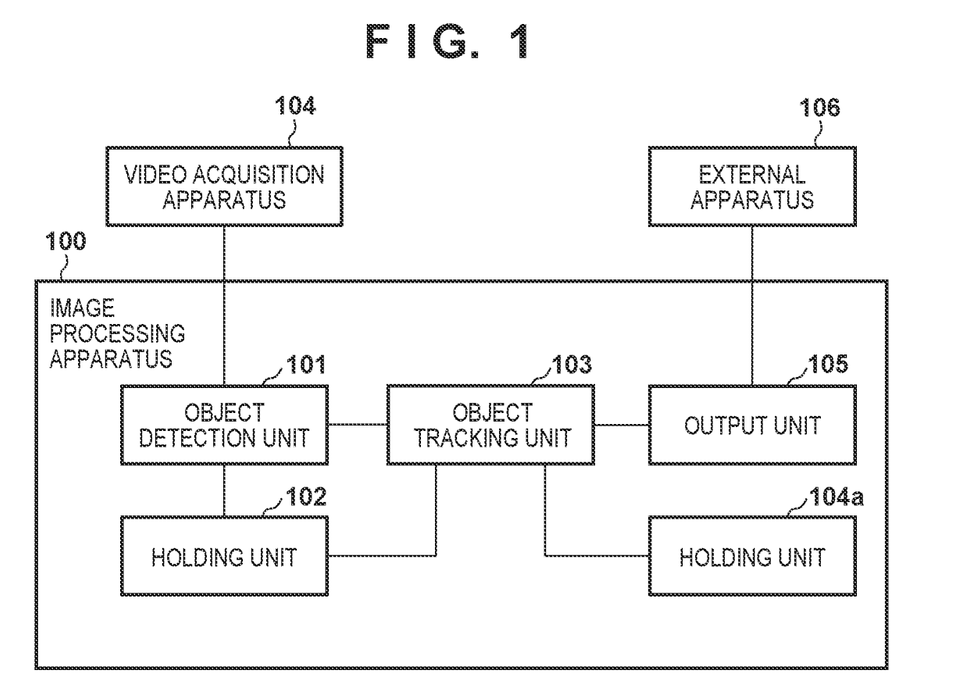
FIG. 1 is a block diagram illustrating a configuration example of a system.

First, a configuration example of a system according to the present embodiment will be described using a block diagram of FIG. 1. As illustrated in FIG. 1, the system according to the present embodiment includes a video acquisition apparatus 104, an image processing apparatus 100, and an external apparatus 106.

First, the video acquisition apparatus 104 will be described. The video acquisition apparatus 104 is configured to enable data communication with the image processing apparatus 100. For example, the video acquisition apparatus 104 is connected to the image processing apparatus 100 via a network such as a LAN or the Internet (a wired or wireless network, or a network corresponding to a combination of a wired network and a wireless network). Note that the video acquisition apparatus 104 and the image processing apparatus 100 may be integrated together rather than being separate apparatuses.

The video acquisition apparatus 104 captures a moving image and outputs images of each frames in the moving image as a captured image. Note that the video acquisition apparatus 104 may be an apparatus for periodically or aperiodically capturing still images and that in that case, the video acquisition apparatus 104 outputs, as captured images, the still images periodically or aperiodically captured. Alternatively, the video acquisition apparatus 104 may be an apparatus that holds moving images or a still image group. In that case, in response to a request from the image processing apparatus 100, the video acquisition apparatus 104 supplies images of each frames in the moving image and each of the still images in the still image group, to the image processing apparatus 100 as captured images.

Now, the image processing apparatus 100 will be described. The image processing apparatus 100 is a computer apparatus such as a personal computer (PC), a tablet terminal apparatus, or a smartphone. The image processing apparatus 100 detects and tracks objects (moving bodies such as persons, animals, or vehicles) from each of the captured images (also referred to as a frame) supplied from the video acquisition apparatus 104, and outputs the result of the tracking. Functional units of the image processing apparatus 100 will be described below.

Now, the external apparatus 106 will be described. Similar to the video acquisition apparatus 104, the external apparatus 106 is configured to enable data communication with the image processing apparatus 100. The external apparatus 106 is, for example, an apparatus including a function of displaying information output from the image processing apparatus 100 using images, characters, or the like, a function of registering the information in the external apparatus 106, a function of transferring the information to another external apparatus, and the like. Alternatively, the external apparatus 106 may be an image processing apparatus separate from the present apparatus.

Figure 3:
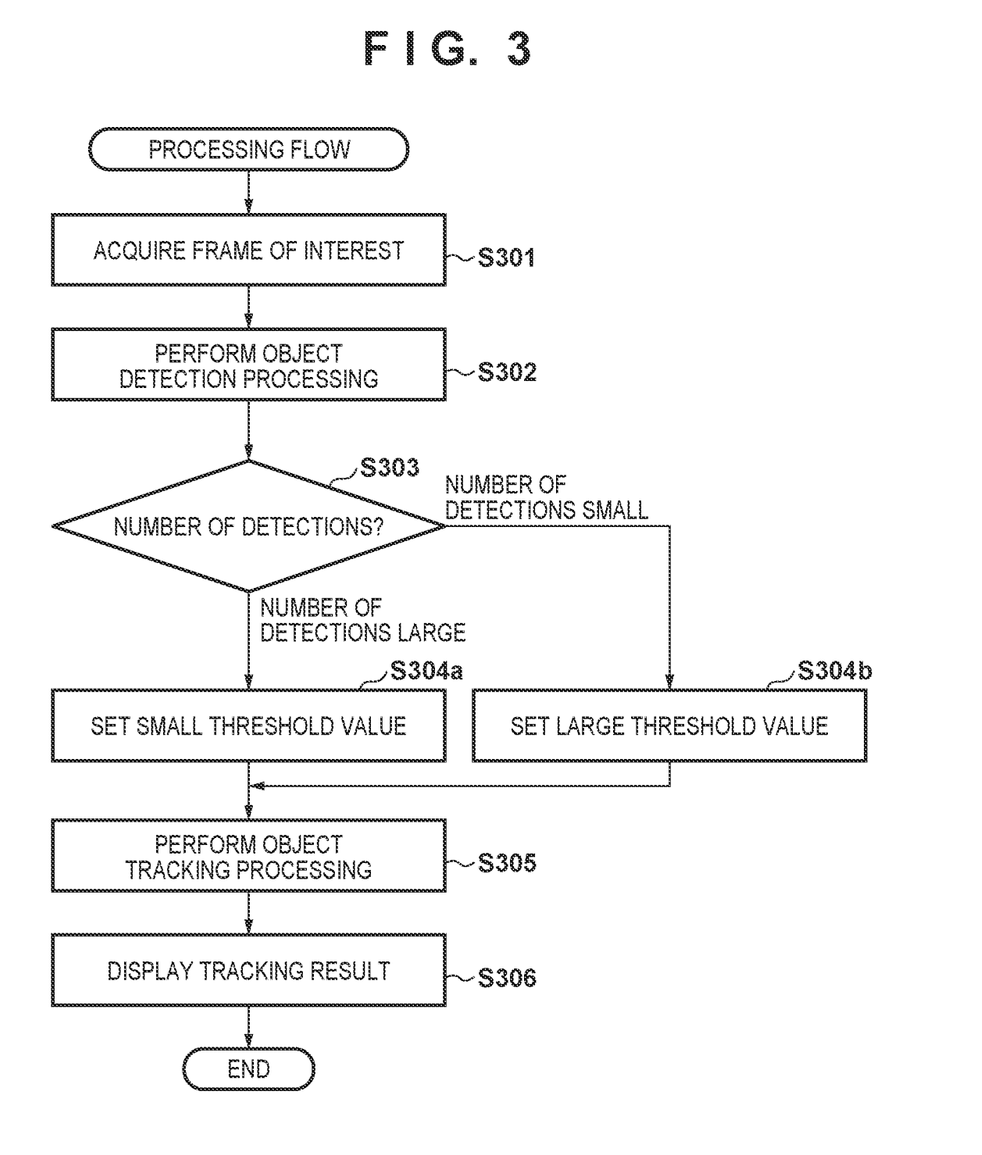
FIG. 3 is a flowchart of processing for tracking an object in each frames.

Now, processing performed by the image processing apparatus 100 in order to track an object in each of the frames acquired from the video acquisition apparatus 104 will be described in accordance with a flowchart in FIG. 3. Note that the processing in accordance with the flowchart in FIG. 3 is processing performed on one frame received from the video acquisition apparatus 104. Thus, the image processing apparatus 100 executes the processing in accordance with the flowchart of FIG. 3 for each of the frames received from the video acquisition apparatus 104.

In step S301, an object detection unit 101 acquires (image acquisition) a frame output from the video acquisition apparatus 104 as a frame of interest. In step S302, the object detection unit 101 detects objects from the frame of interest acquired in step S301, and stores, in the holding unit 102, information such as the detection positions of the objects detected from the frame of interest, an index of the frame of interest, and the like. The index of the frame of interest may be any information as long as the index enables identification of the position (order) of the frame of interest in a frame row supplied from the video acquisition apparatus 104. The index may be, for example, a frame number or an image capture date.

In step S303, the object detection unit 101 counts the number (number of detections) of objects detected from the frame of interest in step S302, and determines whether the number of detections is equal to or larger than a predetermined value. In a case where the result of such a determination indicates that the number of detections is larger than or equal to the predetermined value, then the number of detections is determined to be large, and the processing proceeds to step S304*a*. In a case where the number of detections is smaller than the predetermined value, the number of detections is determined to be small, and the processing proceeds to step S304*b*.

In step S304*a*, the object detection unit 101 sets $\theta 1$ as the threshold value. On the other hand, in step S304*b*, the object detection unit 101 sets $\theta 2$ ($\theta 2 > \theta 1$) as the threshold value.

The threshold value indicates the maximum distance (distance on the frame) that the object can move between a past frame preceding the frame of interest and the frame of interest. A large number of detections from the frame means that a large number of objects are in the frame, and in such a case, it is conceivable that the object may be less likely to move broadly between frames (the movement distance is long). On the other hand, a small number of detections from the frame means that a small number of objects are in the frame, and in such a case, it is conceivable that the object may move broadly between the frames (the moving distance is long). Thus, the threshold value to be set in a case where the number of detections is small is set larger than the threshold value to be set in a case where the number of detections is large.

In a case where the number of detections is smaller than the predetermined number, the object detection unit 101 sets a larger threshold value for a smaller number of detections, and in a case where the number of detections is equal to or larger than the predetermined number, a threshold value may be set that is "equal to or smaller than a threshold value set in a case where the number of detections is equal to the predetermined number." Alternatively, the object detection unit 101 may set a larger threshold value for a smaller number of detections, and may set a smaller threshold value for a larger number of detections.

In this way, the method of setting the threshold value in accordance with the number of detections is not limited to a specific method as long as the method satisfies the condition "a threshold value set in a case where the number of detections is a first number is larger than a threshold value set in a case where the number of detections is a second number (>the first number)." The threshold value corresponding to the number of detections may be set by a user, or may be determined by using a threshold value corresponding to the number of detections based on statistical data regarding the relationship between the number of detections and the moving distance of the object.

In step S305, the object tracking unit 103 performs object tracking processing using information stored in the holding unit 102. First, the object tracking unit 103 identifies, from the holding unit 102, a past index closest to the index of the frame of interest, and acquires, from the holding unit 102, the detection positions of each objects detected from the frame of the identified index (past frame). Then, the object tracking unit 103 generates pairs of objects between an object group detected from the frame of interest and an object group detected from the past frame such that "a total difference (total distance) is minimized that is obtained by totaling, for all pairs, a difference (distance) between the detection position of one of the objects included in the pair and the detection position of the other object included in the pair." Then, after generation of the pairs, the object tracking unit 103 determines each of the objects included in the pair for which the difference between the detection positions is smaller than the threshold value to be the identical object. On the other hand, the object tracking unit 103 determines one object and the other object included in the pair for which the difference between the detection positions is equal to or larger than the threshold value not to be the identical object, and the object tracking unit 103 determines "the object detected from the frame of interest" included in the pair to be an object newly appearing in the frame of interest. The object tracking unit 103 then tracks the objects from the past frame to the frame of interest.

Figure 5:
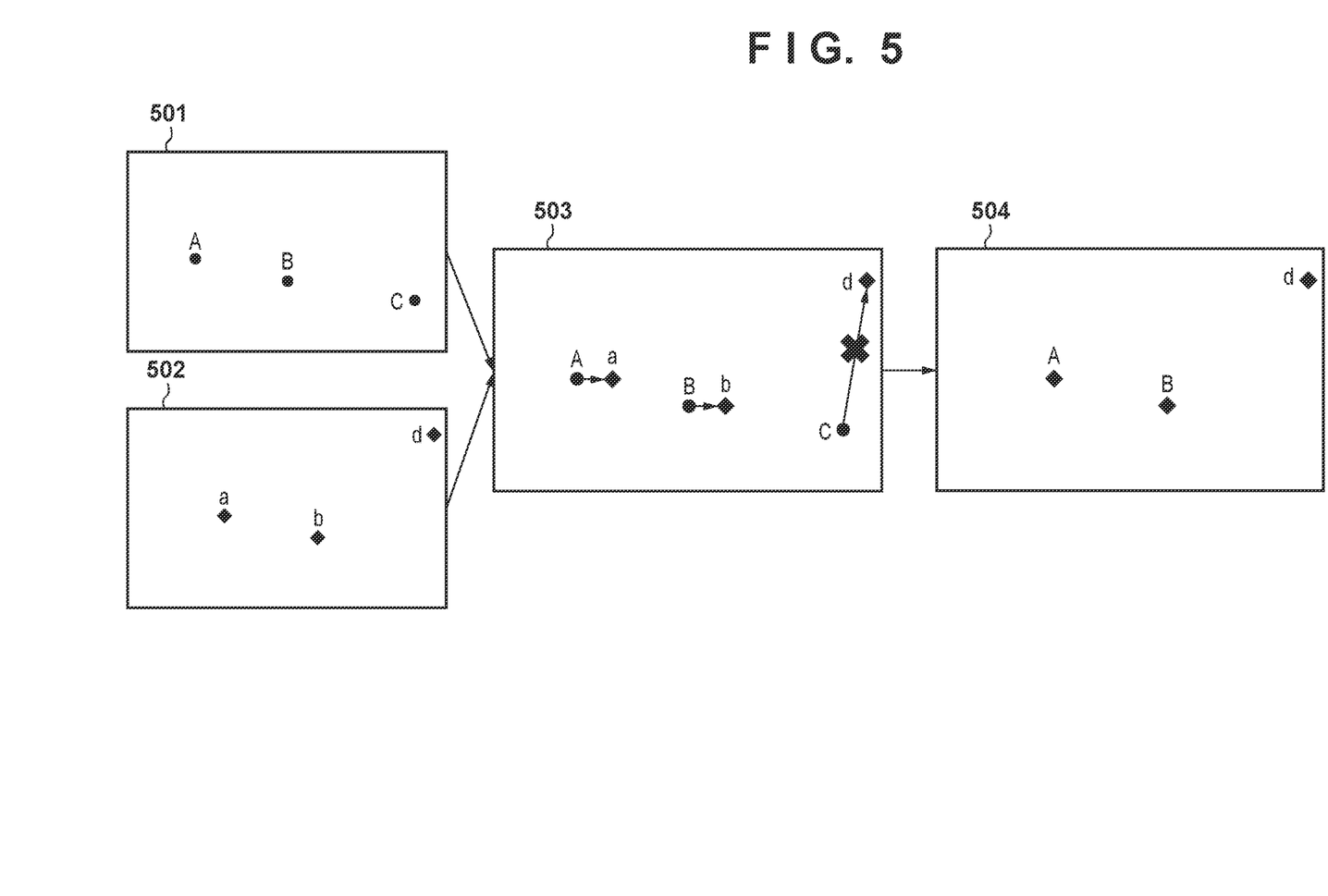
FIG. 5 is a diagram illustrating an example of operations of an object tracking unit 103.

Operations of the object tracking unit 103 will be described with reference to FIG. 5 as an example. An object A, an object B, and an object C are detected from a past frame 501, and an object a, an object b, and an object d are detected from a frame of interest 502. In this case, the object tracking unit 103 generates pairs of objects between the object A, the object B and the object C detected from the past frame 501, and the object a, the object b, and the object d detected from the frame of interest 502, respectively. The result of generation of pairs is illustrated in the frame 503. The inside of the frame 503 illustrates a state in which the past frame 501 and the frame of interest 502 are overlaid on each other, and as a combination of pairs, "a pair of the object A and the object a, a pair of the object B and the object b, and a pair of the object C and the object d" are generated. In other words, the minimum total difference for combinations of pairs is "the total difference of the difference between the detection position of the object A and the detection position of the object a, the difference between the detection position of the object B and the detection position of the object b, and the difference between the detection position of the object C and the detection position of the object d." Here, the difference between the detection position of the object A and the detection position of the object a and the difference between the detection position of the object B and the detection position of the object b are each smaller than the threshold value, and thus the object a is determined to be the identical object to the object A, and the object b is determined to be the identical object to the object B. However, the difference between the detection position of the object C and the detection position of the object d is equal to or larger than the threshold value, and thus the object C and the object d are determined not to be the identical object, and the object d is determined to be an object newly appearing in the frame of interest 502. Thus, as illustrated in the frame 504, the object tracking unit 103 determines that the object A, the object B, and the object d appear in the frame of interest. Then, the object tracking unit 103 tracks the object A and the object B from the past frame 501 to the frame of interest 502, and determines the object d to be an object newly appearing in the frame of interest 502.

The object tracking unit 103 stores the result of the tracking processing described above in the holding unit 104*a*. For example, the object tracking unit 103 stores a set, about each objects in the frame of interest, including the index of the frame of interest, the identification information of the object, and the detection position of the object, in the holding unit 104*a* as the result of the tracking processing. For the object in the frame of interest determined to be the identical object to the object in the past frame with the identification=A, the identification information=A and the detection position of the object, along with the index of the frame of interest, are stored in the holding unit 104*a* as a set. For the object determined to be the identical object to none of the objects in the past frame and determined to be an object newly appearing in the frame of interest, identification information newly issued for the object and the detection position of the object, along with the index of the frame of interest, are stored in the holding unit 104*a* as a set.

In step S306, the output unit 105 generates display information based on the frame of interest, and the identification information and the detection position of the object stored in the holding unit 104*a* along with the index of the frame of interest as a set, and outputs the display information generated to the external apparatus 106. For example, the output unit 105 overlays a marker and the identification information of the object at the detection position of the object on the frame of interest, and outputs, to the external apparatus 106, the frame of interest overlaid with the marker and the identification information.

Figure 4:
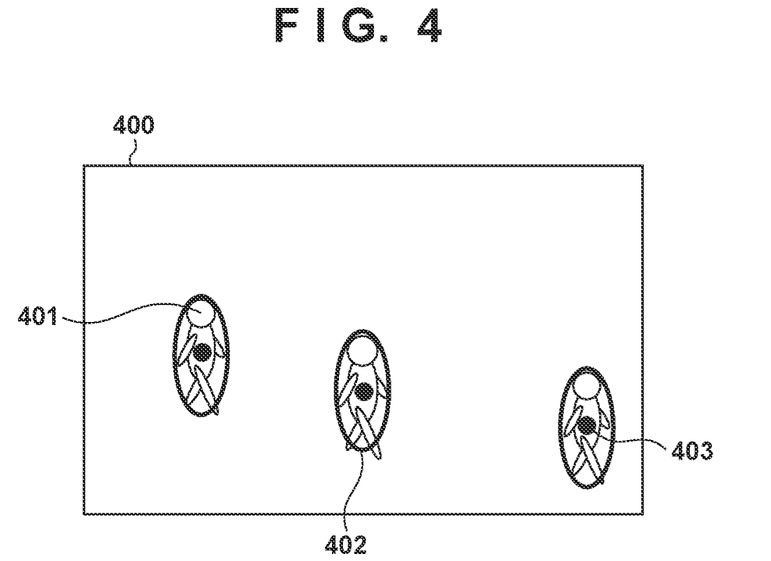
FIG. 4 is a diagram illustrating a display example in an external apparatus 106.

A display example in the external apparatus 106 is illustrated in FIG. 4. FIG. 4 illustrates a frame 400 of interest including three human bodies as objects to be tracked. For the human body at the left end, a marker is overlaid at the detection position and a frame 401 is overlaid for the region of the human body. For the central human body, a marker is overlaid at the detection position and a frame 402 is overlaid for the region of the human body. For the human body at the right end, a marker is overlaid at the detection position and a frame 403 is overlaid for the region of the human body.

As described above, in the present embodiment, in the tracking of an identical object between frames, each of the objects for which the difference in detection position between the frames is smaller than the threshold value corresponding to "the number of objects detected from the frame" is determined to be the identical object, whereas each of the objects for which the difference in detection positions between the frames is equal to or larger than the threshold value is not determined to be the identical object. Consequently, for example, even in a case where an identical object moves broadly between the frames, the object can be accurately tracked.

Note that the present embodiment uses the method of combining the distances between each of the detection positions in the frames as a method used for the tracking processing but that the tracking method is not limited to that described above, and that any method may be used that uses the concept of distance for the tracking processing such as the prediction of the detection position.

Also as in the present embodiment, the number of detections of objects detected from the frame is acquired as "reference information referenced to set the threshold," and the threshold value is set in accordance with the reference information. However, the reference information is not limited to that described above, and the density of objects in the frame or a frame rate (the frame rate of the processing by the object detection unit 101 or the object tracking unit 103) may be used as the reference information.

In a case where "the density of objects in the frame" is used as the reference information, for example, in a case where the average of the distances (average distance) between the positions of each of the objects detected from the frame is shorter than the predetermined distance, the density of objects in the frame is determined to be high, and $\theta1$ is set as the threshold value. On the other hand, in a case where the average distance is equal to or longer than the predetermined distance, the density of objects in the frame is determined to be low, and $\theta2$ ($\theta2>\theta1$) is set as the threshold value. In other words, in a case where "the density of objects in the frame" is used as the reference information, the method of setting the threshold value is not limited to a specific method as long as "the threshold value set in a case where the density is a first density is larger than the threshold value set in a case where the density is a second density (>first density)." Also, the method of determining the density is not limited to the method described above.

Alternatively, in a case where the "frame rate" is used as the reference information, for example, a frame rate equal to or higher than a predetermined frame rate is determined to indicate a low possibility that the object moves broadly between the frames, and θ1 is set as the threshold value. On the other hand, a frame rate lower than the predetermined value is determined to indicate a high possibility that the object moves broadly between the frames, and thus, θ2 (θ2>θ1) is set as the threshold value. In other words, in a case where the "frame rate" is used as the reference information, the method of setting the threshold value is not limited to a specific method as long as "the threshold value set in a case where the frame rate is a first frame rate is larger than the threshold value set in a case where the frame rate is a second frame rate (>first frame rate)." Alternatively, as the method of setting the threshold value, two or more of the setting methods described above may be used in combination as appropriate.

Second Embodiment

In each of the following embodiments, including the present embodiment, differences from the first embodiment will be described, and elements not particularly referred to below may be similar to such elements in the first embodiment: The object tracking processing is also used for pass count for counting the number of objects traversing a line or a region on the frame. The tracking processing often involves a longer processing time for a larger number of objects to be tracked, and the pass count as described above requires performing the tracking processing in high-speed.

Thus, for a minimized number of tracking targets, regions for tracking may be limited. In the present embodiment, a description will be given of a method for improving count accuracy in a case where the pass count is performed with limitation on the regions for tracking as described above.

Figure 6:
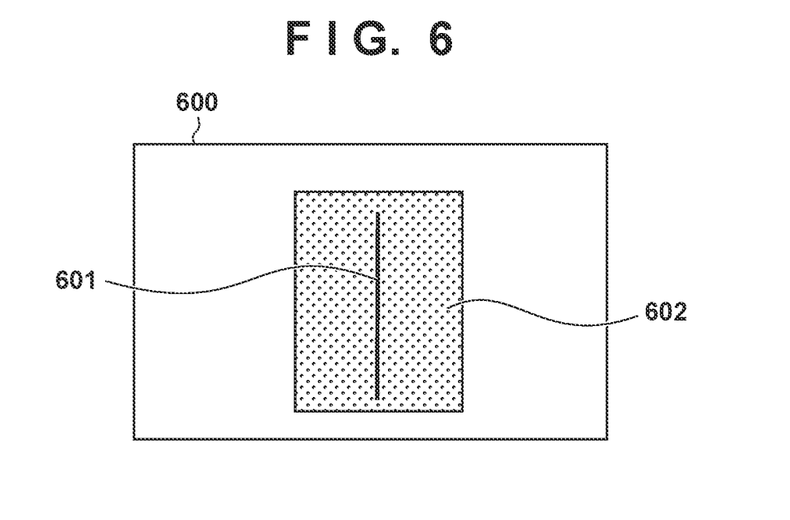
FIG. 6 is a diagram illustrating a pass line 601 and a tracking region 602.

In the present embodiment, as illustrated in FIG. 6, the image processing apparatus 100 sets, at preset positions in the frame, a pass line 601 and a tracking region 602 including/enclosing the pass line 601. The image processing apparatus 100 performs detection and tracking of objects only in the tracking region 602, and detects passage of an object traversing across the pass line 601, and counts the number of such detections (number of objects traversing the pass line 601). Here, in order to detect passage of an object traversing across the pass line 601, the identical object needs to be consecutively detected in two or more frames. Thus, the tracking region 602 is set such that within a range of the region, at least the object to be tracked does not pass the pass line 601 within the period of time between the frames. This allows accurate pass count to be performed with a reduction in the amount of processing.

Here, "the distance the object moves within the period of time between the frames" varies depending on surrounding environments for the object, and thus a fixed size of the tracking region 602 may cause the tracking processing and thus the pass count to fail for an object that moves broadly within the period of time between the frames. Thus, in the present embodiment, the size of the tracking region 602 is determined in accordance with the threshold value set in step S304a or step S304b, and the tracking region 602 of the size determined is set at a preset position on the frame.

Figure 7A:
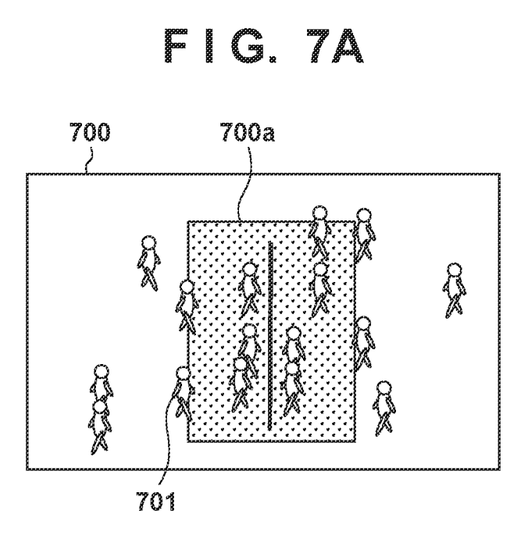
FIGS. 7A and 7B are diagrams illustrating a tracking region of size in accordance with a threshold value.
Figure 7B:
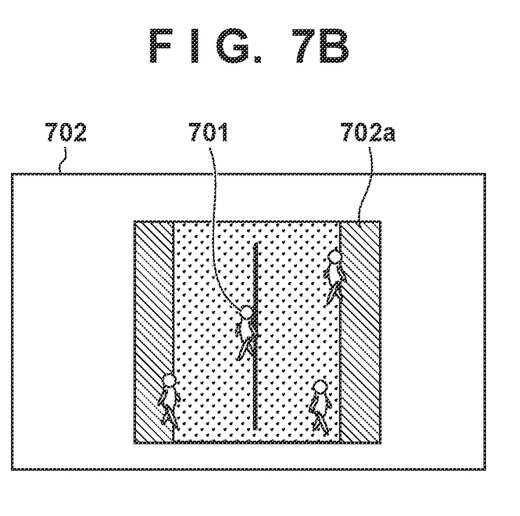

The tracking region of the size corresponding to the threshold value will be described with reference to FIGS. 7A and 7B as an example. A frame 700 illustrated in FIG. 7A includes a relatively large number of objects 701, and a frame 702 illustrated in FIG. 7B includes a relatively small number of objects 701. Thus, (the threshold value θ1 set for the frame 700)<(the threshold value θ2 set for the frame 702). In the present embodiment, a tracking region of a larger size is set for a larger threshold value set, and a tracking region of a smaller size is set for a smaller threshold value set. In the examples in FIGS. 7A and 7B, (the threshold value θ1 set for the frame 700)<(the threshold value θ2 set for the frame 702), and thus the size of a tracking region 700a set for the frame 700 is smaller than the size of a tracking region 702a set for the frame 702.

"The size of the tracking region" may be one or both of the vertical size and the horizontal size of the tracking region. Note that in a case where the tracking region is a circular region, "the size of the tracking region" may be the radius of the circular region. Also, in a case where the tracking region is an elliptical region, "the size of the tracking region" may be one or both of the major axis and the minor axis of the elliptical region.

As described above, according to the present embodiment, a tracking region of the size corresponding to the threshold value can be set as a tracking region in which an object traversing and passing across the pass line or the number of such objects is detected. This allows an object moving broadly within the period of time between the frames to be detected before passing beyond the pass line, and thus the object is prevented from being missed, enabling a reduction in the possibility of failure in the tracking processing or the pass count. According to the present embodiment, by setting a tracking region of the size corresponding to the threshold value, the count accuracy can be improved with no significant increase in the amount of the tracking processing.

Third Embodiment

Each of the functions of the image processing apparatus 100 illustrated in FIG. 1 may be implemented in hardware, or other functional units except the holding units 102 and 104a may be implemented by software (computer programs). In the latter case, the computer apparatus capable of executing the computer programs is applicable to the image processing apparatus 100 described above. A hardware configuration example of such a computer apparatus will be described using a block diagram in FIG. 2.

Figure 2:
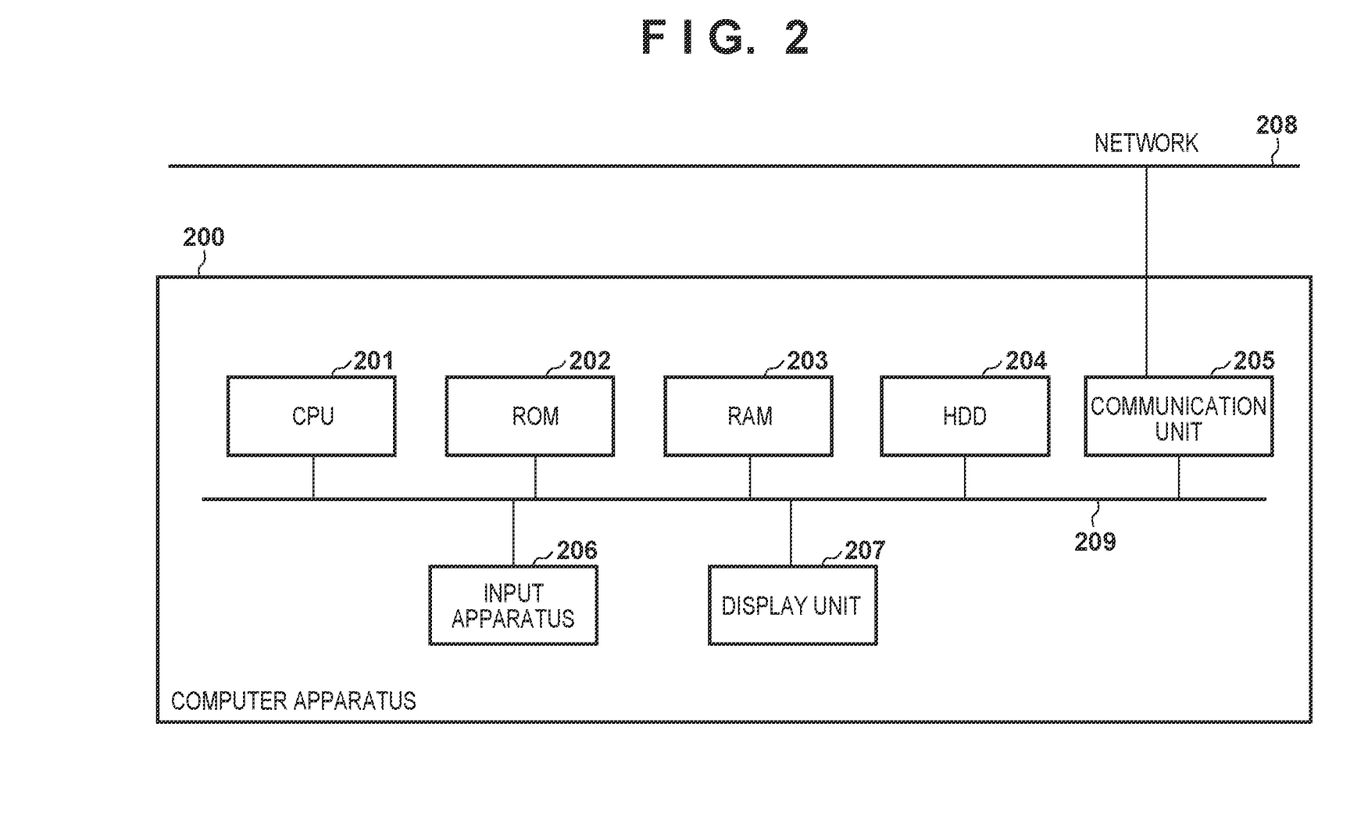
FIG. 2 is a block diagram illustrating a hardware configuration example of a computer apparatus.

A CPU 201 executes various processing operations using computer programs and data stored in a ROM 202 and a RAM 203. In this way, the CPU 201 controls the operation of the computer apparatus 200 as a whole, and executes or controls various processing operations described as being executed by the image processing apparatus 100.

The ROM 202 stores setting data for the computer apparatus 200, computer programs and data related to activation of the computer apparatus 200, computer programs, data, and the like related to the basic operation of the computer apparatus 200.

The RAM 203 includes an area for storing computer programs and data loaded from the ROM 202 and a hard disk drive (HDD) 204. Alternatively, the RAM 203 includes an area for storing data received from apparatuses on a network 208 (the video acquisition apparatus 104, the external apparatus 106, and the like described above) via a communication unit 205. Alternatively, the RAM 203 includes a work area used when the CPU 201 executes various processing operations. Thus, the RAM 203 can provide various areas as appropriate.

In the HDD 204, an operating system (OS), computer programs and data, and the like are saved. The computer programs and data are used to cause the CPU 201 to execute or control each of the processing operations described as being performed by the image processing apparatus 100. The computer programs and data stored in the HDD 204 are loaded into the RAM 203 as appropriate under the control of the CPU 201, and are to be processed by the CPU 201. The holding units 102 and 104a described above can be implemented using the RAM 203 and the HDD 204.

The communication unit 205 is a network interface configured to connect the computer apparatus 200 to the network processing apparatus 208. The computer apparatus 200 performs data communication with the apparatuses on the network 208 via the communication unit 205. The network 208 is a wired network and/or a wireless network such as a LAN or the Internet.

An input apparatus 206 is a user interface such as a keyboard, a mouse, a touch panel, or the like, and by operating the input apparatus 206, the user can input various instructions to the CPU 201.

A display apparatus 207 includes a liquid crystal screen or a touch panel screen, and can display the results of processing by the CPU 201 using images, characters, or the like. Note that the display apparatus 207 may be a projection apparatus such as a projector which projects images and characters.

All of the CPU 201, the ROM 202, the RAM 203, the HDD 204, the communication unit 205, and the input apparatus 206, and the display apparatus 207 are connected to a system bus 209. Note that the configuration illustrated in FIG. 2 is an example of a hardware configuration of a computer apparatus applicable to the image processing apparatus 100, and may be varied/modified as appropriate.

Alternatively, the numerical values, processing timings, processing orders, processing entities, and data (information) transmission destinations/transmission sources/storage locations, and the like used in the embodiments described above are referred to for specific description as an example, and are not intended for limitation to these examples.

Alternatively, some or all of the embodiments described above may be used in combination as appropriate. Alternatively, some or all of the embodiments described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-092514, filed Jun. 1, 2021, which is hereby incorporated by reference herein in its entirety.

What is claimed is:

1. An image processing apparatus comprising:
at least one processor; and
at least one memory having stored thereon instructions which, when executed by the at least one processor, cause the image processing apparatus at least to:
acquire reference information which indicates at least one of a number of objects detected from a frame, a density of an object in a frame, or a frame rate; and
track an identical object between frames, wherein
the tracking determines that each of objects for which a difference in a detection position between the frames is smaller than a threshold value corresponding to the reference information is an identical object, and does not determine that each of objects for which a difference in the detection position between the frames is equal to or larger than the threshold value is an identical object.

2. The image processing apparatus according to claim 1, wherein the instructions, when executed by the at least one processor, further cause the image processing apparatus at least to:
set the threshold value in accordance with the reference information.

3. The image processing apparatus according to claim 2, wherein a threshold value set in a case where the number is a first number is larger than a threshold value set in a case where the number is a second number larger than the first number.

4. The image processing apparatus according to claim 2, wherein
a threshold value set in a case where the density is a first density is larger than a threshold value set in a case where the density is a second density higher than the first density.

5. The image processing apparatus according to claim 2, wherein
a threshold value set in a case where the frame rate is a first frame rate is larger than a threshold value set in a case where the frame rate is a second frame rate higher than the first frame rate.

6. The image processing apparatus according to claim 1, wherein the instructions, when executed by the at least one processor, further cause the image processing apparatus at least to:
determine, in accordance with the threshold value, a size of a region that is set on the frame and in which detection and tracking of an object are performed.

7. The image processing apparatus according to claim 6, wherein the determining determines the size of the region such that the size of the region increases consistently with the threshold value being larger and that the size of the region decreases consistently with the threshold value being smaller.

8. The image processing apparatus according to claim 1, wherein the instructions, when executed by the at least one processor, further cause the image processing apparatus at least to:
acquire, as the frame, an image of each frame in a moving image or a still image periodically or aperiodically captured.

9. The image processing apparatus according to claim 1, wherein the object is a moving object.

10. The image processing apparatus according to claim 1, wherein the threshold value is a maximum distance that the object is allowed to move between frames.

11. An image processing method performed by an image processing apparatus, the image processing method comprising:
acquiring reference information which indicates at least one of a number of objects detected from a frame, a density of an object in a frame, or a frame rate; and
tracking an identical object between frames, wherein
in the tracking, each of objects for which a difference in a detection position between the frames is smaller than a threshold value corresponding to the reference information is determined to be an identical object, and each of objects for which a difference in the detection position between the frames is equal to or larger than the threshold value is not determined to be an identical object.

12. A non-transitory computer-readable storage medium in which a computer program is stored, the computer program causing a computer to:
acquire reference information which indicates at least one of a number of objects detected from a frame, a density of an object in a frame, or a frame rate; and
track an identical object between frames, wherein
the tracking determines that each of objects for which a difference in a detection position between the frames is smaller than a threshold value corresponding to the reference information is an identical object, and does not determine that each of objects for which a difference in the detection position between the frames is equal to or larger than the threshold value is an identical object.

* * * * *